United States Patent [19]

Sovish et al.

[11] 4,194,750
[45] Mar. 25, 1980

[54] SEALING DEVICE WITH EXTERNAL DEFORMABLE FLANGES

[75] Inventors: Richard C. Sovish, Waterloo; Marc F. L. Moisson, Strombeek-Bever, both of Belgium

[73] Assignee: N.V. Raychem S.A., Kessel-lo, Belgium

[21] Appl. No.: 847,823

[22] Filed: Nov. 2, 1977

[30] Foreign Application Priority Data

Nov. 3, 1976 [GB] United Kingdom ............... 45725/76

[51] Int. Cl.² .............................................. F16J 15/32
[52] U.S. Cl. ....................................... 277/208; 277/9; 277/189; 174/65 SS; 174/77 R; 174/DIG. 8; 285/DIG. 16; 285/110
[58] Field of Search ......................... 277/1, 4, 5, 9, 12, 277/189, 207 R, 208, 214, 215; 174/65 SS, 65 G, 116, 23 R, 77 R, 151, DIG. 8; 285/DIG. 16, 110, 284, 292, 294, 297

[56] References Cited

U.S. PATENT DOCUMENTS

| 1,817,776 | 8/1931 | Sipe .................................. 277/208 X |
| 1,926,197 | 9/1933 | Durr .................................. 277/208 X |
| 3,297,819 | 1/1967 | Wetmore ....................... 174/DIG. 8 |
| 3,352,212 | 11/1967 | Read .................................. 277/208 X |
| 3,359,362 | 12/1967 | Lusk et al. ........................... 174/77 R |
| 3,423,518 | 1/1969 | Weagant ......................... 174/DIG. 8 |
| 3,654,965 | 4/1972 | Gramain ................................ 285/4 X |
| 3,975,039 | 8/1976 | Penneck et al. ............. 285/DIG. 16 |
| 3,990,661 | 11/1976 | De Groef ....................... 174/DIG. 8 |

FOREIGN PATENT DOCUMENTS

| 1078200 | 3/1960 | Fed. Rep. of Germany ........... 285/110 |
| 974459 | 12/1960 | Fed. Rep. of Germany ....... 174/65 SS |
| 1111256 | 7/1961 | Fed. Rep. of Germany ........... 174/151 |
| 1248392 | 8/1967 | Fed. Rep. of Germany ........... 285/292 |
| 1920637 | 10/1970 | Fed. Rep. of Germany ........ 174/23 R |
| 1600597 | 8/1971 | Fed. Rep. of Germany ........... 285/110 |
| 2320273 | 11/1974 | Fed. Rep. of Germany .... 174/DIG. 8 |
| 2450998 | 5/1975 | Fed. Rep. of Germany .............. 277/1 |
| 1277535 | 10/1961 | France ..................................... 285/110 |
| 1245119 | 9/1971 | United Kingdom ..................... 285/381 |
| 1288648 | 9/1972 | United Kingdom ........... 285/DIG. 16 |
| 1323057 | 7/1973 | United Kingdom ..................... 285/110 |
| 1431167 | 4/1976 | United Kingdom ............. 174/DIG. 8 |
| 1502913 | 3/1978 | United Kingdom ................ 277/207 A |

*Primary Examiner*—Robert S. Ward, Jr.
*Attorney, Agent, or Firm*—Lyon & Lyon

[57] ABSTRACT

A sealing device comprising a hollow body member having a plurality of spaced apart external deformable flanges and provided with a sealant on its external surface, preferably between the flanges. The device may be used to seal a supply line within a duct by pushing it within the duct so that the flanges are deformed, the sealant preferably being provided in a generous amount so that it fills the remaining gaps between the flanges after such deformation. The hollow body member may then be sealed to the supply line using, for example, a heat-shrinkable sleeve. The device may also be used to couple and repair hollow substrates such as gas and water pipes.

34 Claims, 11 Drawing Figures

SEALING DEVICE WITH EXTERNAL DEFORMABLE FLANGES

This invention relates to a method of, and a device for, forming a seal between two or more substrates. The invention is especially applicable to the sealing of supply lines in the termination, joinder and location thereof, the term "supply line" as used herein including any service carrier, for example, gas and water pipes, electric power cables and telephone cables.

It will be appreciated that such supply lines are frequently used in environments which are prone to contaminants such as insects, dust and moisture. However, whilst many devices have been proposed to seal the supply lines to prevent the ingress of such contaminants into, for example, buildings and electrical apparatus, none of these previous proposals has proved completely satisfactory in practice. Another important consideration is to prevent the ingress of leaking gas so as to avoid the risk of serious explosions.

The present invention provides a sealing device comprising a hollow body member provided on its inner and/or outer surface with a plurality of spaced apart flanges, each flange extending away from and around said surface and at least a portion of the flange remote from said surface being deformable, at least at an elevated temperature, and at least part of said surface(s) and/or the surface of the flanges having a sealant thereon.

The present invention also provides a method of forming a seal wherein there is used a sealing device as defined above.

In one especially preferred embodiment the present invention provides a method of forming a seal between the outer surface of an article such as a supply line and the internal walls of a conduit such as a duct through which the article passes, comprising the steps of (a) selecting a sealing device comprising a hollow body member provided on its external surface with a plurality of spaced apart flanges, each flange extending away from and around said external surface and at least a portion of each flange remote from the external surface being deformable, at least at an elevated temperature, a sealant being provided on the external surface and/or the flanges and the diameter of the flanges being greater than the inner diameter of the conduit;

(b) if neccessary or desired heating at least the outer peripheral portions of the flanges to make them deformable and/or to render the sealant flowable, or to increase the deformability or flowability;

(c) inserting the sealing device into the duct at least to the extent that a plurality of flanges is received by the conduit whereby the outer portions of the flanges are deformed by the conduit;

(d) allowing the device to cool if heating has been employed in step (b); and (e) forming a seal between the hollow body member and the article. The seal in step (e) may conveniently be effected by using a heat-recoverable sleeve, which may itself be provided with an inner layer of an adhesive or sealant, and which may be formed integrally with the hollow body member.

In other embodiments the sealing devices may be used to join or terminate supply lines or to seal them within splice cases.

The hollow body member is preferably tubular and of circular cross-section and is provided with at least one aperture communicating with the hollow portion. It may, however, be supplied with one or more such apertures closed, for example by a cap or another rupturable or removable closure member. In such cases the cap or closure member may be removed prior to installation of the device.

The flanges, each of which preferably extends wholly around the hollow body member, are preferably integral with said member and formed from the same material. In such a case the device, apart from the sealant, may conveniently be formed by a one-step moulding operation.

The deformable portion of each flange is preferably a peripheral region and the material of construction of at least the peripheral region is preferably one which softens at elevated temperatures so that said region is substantially rigid at and below the maximum termperature likely to be encountered in practice but can be deformed by an applied force on heating to or above a certain temperature. In that case, it will be necessary to heat at least said peripheral region to or above that certain temperature in order to install the device. Alternatively, said peripheral region may be deformable at, for example, room temperature, in which case heating may not be necessary, although heating may be desirable to increase the deformability of the pheripheral region. As mentioned above, each flange is preferably integral with the hollow body member and since, for the purposes of installation of the sealing device, it is preferred to maintain the body member in a rigid state but to render at least the said peripheral region of each flange deformable, it is preferred to heat only the flange(s) and not the body portion.

A preferred embodiment of the invention comprises an elongate tubular body member provided with two or more axially spaced annular flanges extending in a generally radial direction from its internal and/or external surface, the body member and the annular flanges being relatively rigid at any temperature likely to be encountered in practice but at least the peripheral region of each annular flange being deformable at an elevated temperature, at least a part of each space defined by the surface of the body member and adjacent flanges containing a quantity of sealant. Each flange is preferably deformable to such an extent that at least the peripheral region of each flange, after deformation, extends substantially parallel to the longitudinal axis of the body member. To this end, each flange preferably tapers towards the edge thereof remote from the surface of the body member or is otherwise profiled, so that, during installation, each flange bends about a circle section which extends substantially mid-way between the surface of the body member and the outer edge of each flange, but is not appreciably deformed near the body member.

In typical applications of the sealing devices in which, for example, a conduit of inner diameter of about 7 or 8 cms is to be sealed the flanges will be from 1 mm to 1 cm in width, generally from 2 to 6 mm. In some cases it may be advantageous for the widths of the individual flanges to vary along the length of the hollow body member. This may be done in uniform manner, for example four successive flanges may have widths of 2, 3, 4 and 5 mm so as to produce a tapered outer surface for ease of insertion of the device into the duct, or in staggered or random fashion.

As mentioned above the flanges preferably extend in a generally radial direction for example normal to the surface of the hollow body member. However, in certain applications it may be advantageous to form the sealing device so that the flanges slope outwardly and/or inwardly from the surface of the hollow body member so as to promote deformation of the flanges in a desired direction.

Preferably a minimum of about 30% and, most preferably, a minimum of about 50% of the surface area of a side of each flange contacts the surface(s) of, for example, the duct after installation of the device. Further, the axial spacing of the flanges is preferably so chosen that, after installation, adjacent flanges do not contact each other. There are preferably more than two flanges, for example four or five flanges or more. As will be appreciated, the optimum number of flanges and dimensions of the sealing device will depend on the field of application of the device and may be determined by simple experiments. Generally, the various dimensions of the device and the number of flanges, as well as the type of sealant used, will depend on the fluid pressure that is likely to be encountered by the seal in practice. The flanges are preferably thin enough that they can be substantially uniformly heated throughout their thicknesses.

In preferred embodiments of the present invention the space between adjacent flanges acts as a reservoir for a considerable quantity of sealant. This preferably results in the sealant being exuded into contact with the surface(s) of, for example, the duct, ensuring that a substantially fluid-tight seal is formed between the sealing device and said surface(s).

More particularly, and as will be described in more detail hereinafter with reference to the drawings, the space between the or each pair of adjacent flanges may be provided with sealant in such a quantity that, after deformation of the periphery of the flanges, the space defined by the or each pair of adjacent flanges, the surface of the hollow body member and the surface(s) of, for example, the duct, is substantially completely filled with the sealant.

Amongst materials from which the sealing device of the present invention may be constructed there may be especially mentioned, for example, the following:

(1) crystalline polymers which exhibit elastomeric properties either at, about or above their crystalline melting ranges, that is to say thermoplastic polymers and copolymers such as polytetrafluoroethylene, high molecular weight polypropylene and high molecular weight polyethylene, (2) crystalline polymers and copolymers, including polyolefins such as polyethylene, which have been cross-linked by chemical methods or by irradiation, for example by high energy electrons or ionizing radiation and (3) polymers, for example polyvinyl chloride, which are relatively rigid up to a critical temperature range but which may be deformed above that temperature.

Further examples of specific polymers are cross-linked polyvinylidene fluoride, (e.g. Kynar (Trade Mark)), cross-linked polyvinyl chloride, cross-linked or uncross-linked chlorinated polyethylenes, neoprene, ethylene propylene rubbers and silicone rubbers. There are preferably used thermoplastic polymers that have been cross-linked.

The sealant which enhances the bond between the flanges and the substrate(s) advantageously has sealing or bonding properties so as to give the seal both shear and peel strength and may comprise, for example, a hot-melt adhesive or a mastic. It is desirable to use a mastic only if the mastic has a relatively high viscosity (at ambient temperatures) and the surface(s) of the substrate(s) is or are rough. Otherwise it is preferred to use a hot-melt adhesive. As will be appreciated, however, the sealant actually used will depend largely on the stresses likely to be encountered by the seal in practice. Especially suitable are hot-melt adhesives such, for example, as polyamide materials, ethylene/vinyl acetate copolymers and terpolymers (with or without incorporated paraffin waxes) and polyesters. Also suitable are semi-hot melt adhesives which will also melt and flow upon heating, but which will not afterwards be hot-meltable. There may also be mentioned epoxy resins and conventional mastics such, for example, as those based on butyl and isobutylene rubbers modified with suitable materials known in the art.

Obviously the type of sealant employed will depend on the particular requirements in any given case. In general, however, preferred sealants will be those which are substantially solid at ambient temperature and which exhibit a viscosity (measured with a Brookfield Thermocel Viscometer, Model HBT with spindle Sc 421) of from 2000 to 4000 poise at elevated temperatures, e.g. at about 100° C. Obviously, the viscosity of the sealant at all stages of the installation of the sealing device is preferably such that it remains within the gap between the flanges and does not run and leave voids. Especially preferred sealants have softening points, as shown by TMA analysis, of from about 60° to 90° C.

It will be appreciated from the foregoing discussion that an important characteristic of the present invention is that the flanges are deformed by the substrate or substrates to which a seal is to be made and that the seal is enhanced by the sealant which is preferably provided in generous proportions between the flanges.

In one embodiment the flanges are formed externally of a tubular body member. Such a device may, for example, be used in the following application. Underground telephone cables laid in PVC or concrete ducts often lead into manholes which may, for example, house joints between cables. It is desirable, and often essential, to seal the gap between the cable and the walls of the duct at the entrance of the manhole so that water which has seeped into the duct cannot the manhole. Similarly, the ingrees of gas and dust in the manhole should be prevented and, in the reverse, any contaminant in the manhole should be stopped from entering the duct.

A seal between the cable and the duct may readily be achieved by using a sealing device as described above in which the diameter of the flanges is greater than the internal diameter of the duct. The flanges are, if necessary, heated and then the device is forced into the duct; the telephone cable passes through the hollow body member and a seal is made between the cable and the body member by suitable means, for example by means of a heat-shrinkable sleeve made, for example, from cross-linked polyethylene.

Such a device may also be used accurately to seal and locate a cable termination with the duct, in which case the hollow body portion will, of course, have only one open end, or may be used to join two hollow substrates, such as two pipes, one end of the device being inserted in the end portion of one pipe and the other end being inserted in the end portion of the other pipe. The device could also, of course, be used to seal a crack in a single pipe.

Another sealing device provided with external flanges in accordance with the present invention is an end cap or bung which may be used temporarily or permanently to block the end of a tube or a pipeline. A removable end-cap may, for example, be used temporarily to block a heat-shrinkable tube prior to use and may, therefore, advantageously be provided with a handle or other means to facilitate its removal.

Yet another device may be formed so as to function as a grommet for passing a supply line through an aperture in a wall of, for example, the housing of electrical apparatus.

In another embodiment the flanges are formed internally of a tubular body member. Such a sealing device could be used, for example, to join or terminate gas or water pipes. If desired further sealing means such, for example, as heat-recoverable sleeves may be included to enhance the coupling or termination.

In yet another embodiment, the body member is provided with both internal and external flanges so that, for example, a fluid-tight seal is obtained between both the gas or water pipes being joined or terminated and between the sealing device and a duct in which the pipes are located. Again, the seals formed may, in some cases, advantageously be supplemented by other means, for example, heat-shrinkable sleeves or end-caps.

In this respect, the auxiliary sealing members, such as heat-shrinkable sleeves or end-caps, may be integrally formed with the sealing devices of the present invention or may be provided as separate components. The auxiliary sealing member may itself be provided with a sealant to enhance bonding to the substrate concerned. Suitable heat-recoverable articles and sealants for use therewith are, of course, well known in the art.

Although the invention has hereinbefore been described with specific reference to sealing devices comprising hollow cylindrical body members, it should be appreciated that other shaped articles are contemplated, including, for example, members of irregular cross-section and members of more complex configuration such as Y-shaped, T-shaped and X-shaped members having 3 or 4 apertures. In such cases, for example in a break-out termination as described later, one or more of the limbs of the hollow body member may be provided with flanges in accordance with the present invention. In addition, the present invention is not limited to members of continuous cross-section but also includes members having a discontinuity, such as a longitudinal slit therein. For example, in existing systems, in which the end of a pipe, for example, may not be accessible, there may be used a sealing device of the invention that is of the so-called "wrap-arround" type, that is to say a device having a longitudinal slit along the whole of its length so that the device can be opened out and positioned about the pipe, for example, at least a part of the length of each longitudinal edge of the device adjacent to the slit being provided with an elongate flange, the elongate flange associated with one of said edges being urged towards the elongate flange associated with the other edge by, for example, a channel member after the device has been positioned about the substrate(s). Of course, in such a wrap-around device of the invention, the spaced apart flanges will not be continuous, but will also be split, for example radially, to enable the device to be opened out and positioned about a substrate. When, however, the device is in position about the substrate, the opposed radial edges of each split flange preferably meet.

Various embodiments according to the present invention will not be described, by way of example only, with reference to the accompanying drawings, in which:

FIG. 5a is a section through an end cap;

FIG. 5b is an end view of the end cap taken in the direction shown by the arrow in FIG. 5a;

Figure 1:
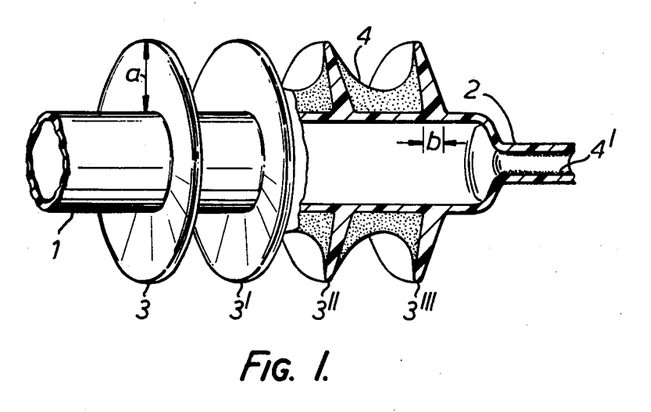
FIG. 1 is a perspective view, partly in section, of a sealing device of the invention before installation in a cable duct.

Referring to FIG. 1 of the drawings, there is shown a device for sealing a telephone cable within an underground duct. The device comprises an elongate, tubular body member 1 one end of which has had formed integrally therewith a heat-shrinkable portion 2. The body member 1 has formed integrally therewith four substantially radially outwardly extending annular flanges 3, 3′, 3″ and 3‴. Typically, the dimension a of each flange 3, 3′, 3″ and 3‴, may be about 5 mm, the dimension b about 1 to 1.2 mm and the spacing between adjacent flanges about 4 to 4.5 mm. The dimension a must, of course, be such that the diameter of the flanges 3, 3′, 3″ and 3‴ is greater than the diameter of the duct into which the sealing device is to be inserted. The body member 1, heat-shrinkable member 2 and flanges 3 may, for example, be manufactured by a one-step moulding process. The space between adjacent flanges 3, 3′, 3″ and 3‴ contains a quantity of sealant 4 (for the sake of clarity the sealant between flanges 3 and 3′ is not shown) and the internal surface of the heat-shrinkable portion 2 is coated with a sealant 4′. As will be seen from FIG. 1, each of the flanges 3, 3′, 3″ and 3‴ tapers towards its periphery to render said periphery more readily deformable during installation of the sealing device. The device comprises a polymeric material that is relatively rigid at ordinary temperatures but that is deformable when heated to an elevated temperature. The sealant 4 and 4′ is preferably solid or very viscous at such ordinary temperatures but is relatively readily flowable at that elevated temperature.

Figure 2:
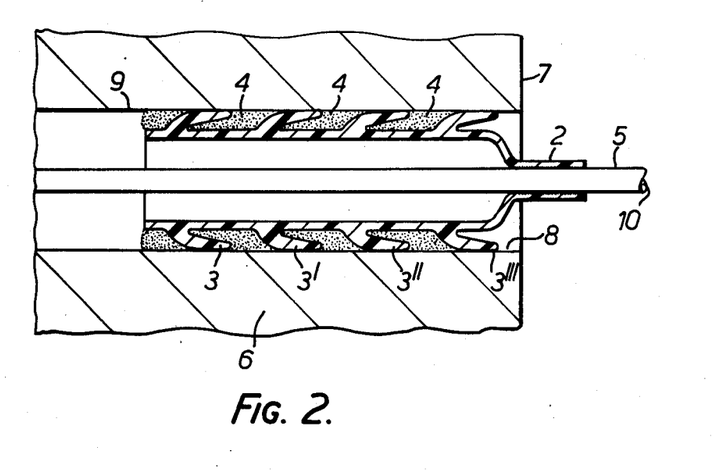
FIG. 2 is a side elevation, partly in section, of the device of FIG. 1 after one mode of installation in a cable duct.

Referring to FIG. 2, there is shown the device of FIG. 1 after installation into the duct 8 which houses the telephone cable 5. The duct 8 is defined by a wall 6, for example of concrete or a plastics material, which terminates in a wall 7 defining a manhole. The sealing device may be installed as follows. The flanges 3, 3′, 3″ and 3‴ and the sealant only are heated using, for example, a flame torch or hot air gun, to such a temperature that substantially the whole of each flange and the sealant become plastic whilst the body portion 1 remains substantially undeformable. The device is then slipped over the accessible end 10 of the cable 5 that is subsequently to be joined to, for example, another cable, and is pushed into the duct 8 whereupon the flanges 3, 3', 3" and 3''' are deformed by the internal surface 9 of the duct wall 6. As can be seen, the peripheral portions of the flanges 3, 3', 3", 3''' have been bent back and extend substantially parallel to, and in contact with (possibly with an intermediate layer of sealant 4), the internal surface 9 of the duct wall 6. This results in a decrease in the volume of each space defined between adjacent flanges 3, 3', 3" and 3''' so that said space is now substantially completely filled with sealant 4. Upon cooling, the flanges 3, 3', 3" and 3''' will usually contract slightly but, because of the orientation of the flanges, this results in the peripheral regions of the flanges moving along the surface 9, rather than away from it so that a good seal between the flanges and the duct wall is maintained.

As will be appreciated, the sealing device could be positioned around the cable 5 before the heating operation and that the latter could be carried out step-wise, that is to say by first heating only flange 3 and sealant 4 adjacent thereto, pushing the device partly into the duct 8, then heating flange 3' and pushing the device further into the duct 8 and so on until the insertion step is complete.

As can be seen, the sealing device is inserted into the duct 8 only to such an extent that the heat shrinkable portion 2 of the device protrudes from the duct 8. This allows easy access to the portion 2 to enable it to be shrunk into contact with the cable 5. This may be achieved by heating the portion 2, using for example a torch or hot air gun, to its shrinkage temperature. At the same time the sealant 4' melts or becomes more flowable and, upon cooling, a water-tight joint between the end of the sealing device and the cable 5 is ensured.

Figure 3:
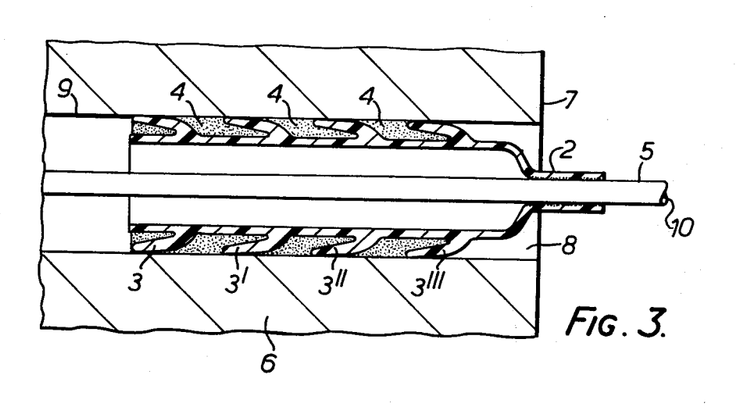
FIG. 3 is a side elevation, partly in section, of the device of FIG. 1 after another mode of installation in a cable duct.

Referring to FIG. 3, there is shown another disposition of the sealing device of FIG. 1 in a cable duct. This disposition may be achieved by retracting (from left to right) the sealing device from the position shown in FIG. 2 until the flanges 3, 3', 3" and 3''' attain the position shown in FIG. 3. The arrangement shown in FIG. 3 has the advantage that, since the interstices between the flanges 3, 3', 3" and 3''' are filled with sealant 4, any pressure exerted by a fluid present in the duct 8 urges the flanges 3, 3', 3" and 3''' into sealing engagement with the surface 9.

Figure 4:
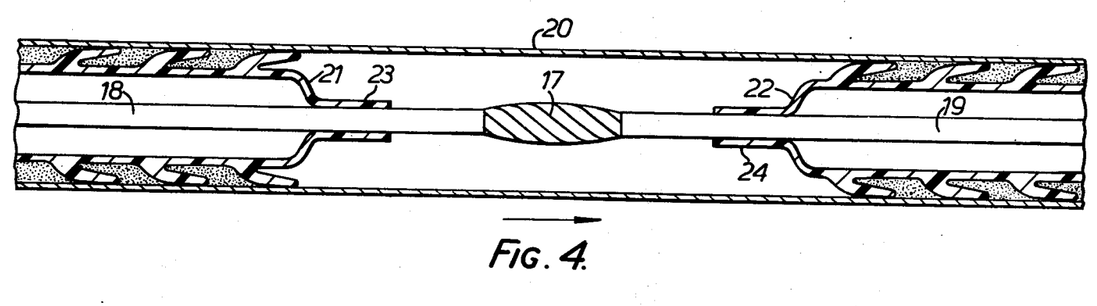
FIG. 4 is a section through an encapsulated cable splice.

In FIG. 4, there is shown an encapsulated splice 17 between two cables 18 and 19. The splice 17, which is not shown in detail, is protected by a casing 20. Two sealing devices 21 and 22, constructed according to the present invention, form a seal with the inside of the casing 20 and comprise heat shrinkable end portions 23 and 24 which have been shrunk about cables 18 and 19, respectively. Such an encapsulation may be formed as follows; the sealing devices are positioned on their respective cables and the outer casing 20 is positioned about cable 18, beyond sealing device 21. The splice 17 is then effected whereupon the sealing devices 21 and 22 are heated to cause end portions 23 and 24, respectively, to shrink and grip the cables. The flanges and the associated sealant are then also heated and the casing 20 is slid over them in the direction shown by the arrow causing the flanges to deform in the manner shown and the sealant to flow and fill the gaps between the flanges. Such an arrangement is suitable for encapsulation of a pressurized splice because pressure within the casing 20 will, if anything, operate to enhance the joint between heat-shrinkable end portions 23 and 24 and their respective cables. The seal between the flanges of device 21 and the inner surface of casing 20 is similarly enhanced.

It will be seen, however, that this is not the case for device 22. In general this is not a problem but it will, in any case, be appreciated that by suitable modifications it is possible to ensure that the flanges of both sealing devices are deformed inwardly towards the splice. One simple manner in which this could be achieved would be to replace the tubular casing 20 by a wrap-around casing or a casing made from two half-shells in which case the flanges may advantageously be initially formed at an angle so that they adopt the desired orientation on heating. In other cases it may be possible to cause the flanges of one device to invert, i.e. reverse orientation, by pulling it axially within tubular casing 20 prior to shrinkage of the end portion. Other variations will be apparent to those skilled in the art.

Figures 5A, 5B:
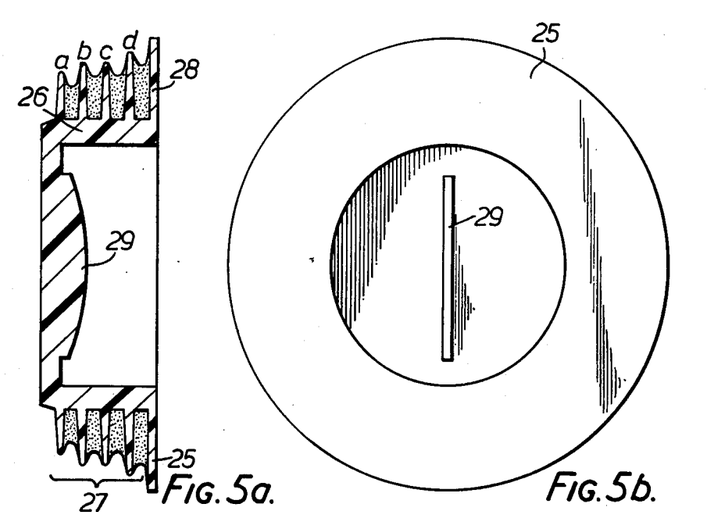

In FIGS. 5a and 5b there is shown a terminal cap 25, comprising a generally tubular body portion 26 provided with four external flanges 27a–d with sealant between them in accordance with the present invention. As explained above, such a cap may be used permanently to block and seal a pipeline but, more often, will be used temporarily to block and seal the end of a piece of tubing, for example a heat-shrinkable wall feed-through device of the type described in British Pat. No. 1,245,119. For this reason it is provided with a built-in handle 29, as shown.

It will be seen that the width of the individual flanges 27a–d increases in the direction of the terminal outer flange 28. The width of flange 27a is about 3 mm, that of flanges 27b and 27c being about 4 mm and that of flange 27d being about 5 mm. This arrangement facilitates insertion of the terminal cap 25.

Figures 6A, 6B, 7:
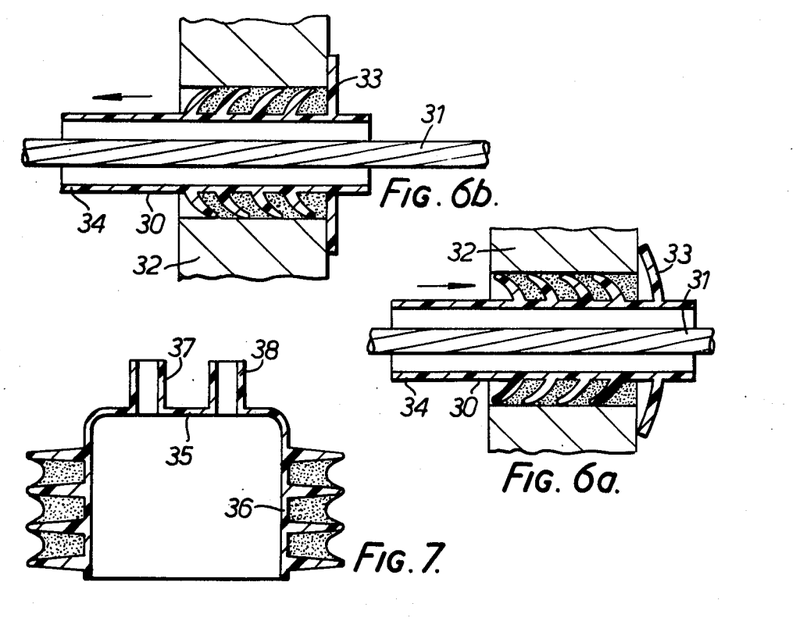
FIGS. 6a and 6b show a sealing device of the present invention used as a grommet.
FIG. 7 is a section through a terminal break-out device.

FIGS. 6a and 6b show a sealing device 30 in accordance with the present invention used as a grommet to position and seal a supply line 31 within an aperture in the wall 32 of, for example, electrical apparatus or a building. As shown, the grommet 30 is inserted in the direction of the arrow of FIG. 6a and is then pulled in the direction of the arrow of FIG. 6b causing the deformable flanges to invert and the larger end flange 33 to come into abuttment with wall 32. Heat-shrinkable end portion 34 may then be shrunk about the supply line 31.

In FIG. 7 there is shown a terminal break-out device 35 provided with a hollow body member 36 provided with deformable flanges and sealant on its external surface in accordance with the present invention and with two heat-shrinkable conduits 37 and 38 for receiving, for example, the conductors of a dual-core cable. The device 35 may be sealed within a protective duct or outer casing by the methods described above.

Figure 8:
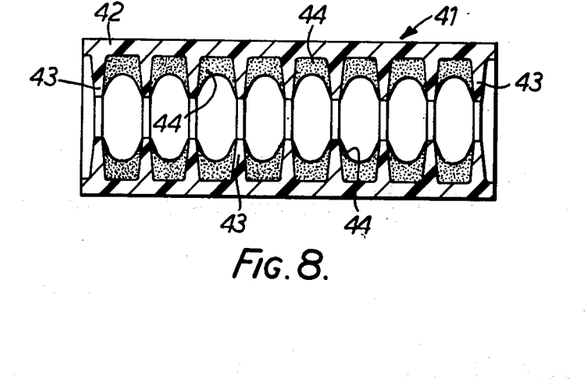
FIG. 8 is an axial section through a further form of sealing device of the invention.
Figure 9:
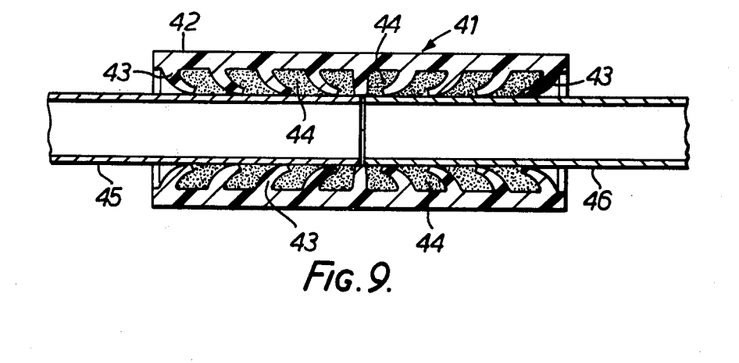
FIG. 9 is an axial section through the device of FIG. 8 in use as a pipe connector.

In FIGS. 8 and 9 there is shown a further form of sealing device adapted to form a sealed joint between two gas pipes 45 and 46. The device 41 comprises an elongate, tubular body member 42 formed with nine radially inwardly extending annular flanges 43. Typically, the width of the flanges may be about 5 mm, the thickness of the flanges about 1 to 1.2 mm and the spacing between adjacent flanges about 4 to 4.5 mm. The diameter of the aperture in each annular flange 43 must, of course, be smaller than the external diameter of the pipes 45 and 46. The body member 42 and flanges 43 may, for example, be manufactured by a one-step moulding process. The space between adjacent flanges 43 contains a quantity of sealant 44. As will be seen from FIG. 8, each of the flanges 43 tapers towards its periphery to render the peripheral region of each flange 43 more readily deformable during installation of the device. The device comprises a polymeric material that is relatively rigid at ordinary temperatures but that is deformable when heated to an elevated temperature. The sealant 44 is preferably solid or very viscous at such ordinary temperatures but should be relatively readily flowable at that elevated temperature.

Referring to FIG. 9, there is shown the device of FIG. 8 after being used to join together the two pipes 45 and 46. The device 41 may be installed as follows. The flanges 43 and the sealant 44 only are heated using, for example, a flame torch or hot air gun, to such a temperature that substantially the whole of each flange and the sealant becomes plastic whilst the body portion 41 remains substantially undeformable. The device is then pushed over the accessible end of the pipe 45 that is to be joined to pipe 46 until the pipe 45 extends half way along the body member 41. Whilst the flanges 43 and sealant 44 are still at an elevated temperature, the other pipe 46 is inserted into the device 41 until the two pipes abut one another. As can be seen, during these operations, the peripheral portions of the flanges 43 are deformed (in a direction dependent upon the direction of insertion of the pipes 45 and 46 into the device) and extend substantially parallel to, and in contact with (possibly with an intermediate layer of sealant 44) the external surfaces of the pipes 45 and 46. This results in a decrease in the volume of each space defined between adjacent flanges 43 so that said space is now substantially completely filled with sealant 44. Upon cooling, the flanges 43 will usually contract slightly but, because of the orientation of the flanges 43, this results in the peripheral regions of the flanges 43 moving along the surfaces of the pipes 45 and 46, rather than away from it, so that a good seal between the flanges 43 and the pipes 45 and 46 is maintained.

Attention is drawn to copending application Ser. No. 847,818, filed Nov. 2, 1977 entitled "Sealing Device and Method" filed today by Louis Breesch claiming priority from British application No. 30058/77 filed July 18, 1977.

We claim:

1. A sealing device suitable for use as a duct seal comprising a hollow body member made of a polymeric material and provided on its outer surface with a plurality of spaced apart flanges, such flanges having a peripheral region remote from the surface that is substantially rigid at the maximum temperature likely to be encountered in use of the device and deformable only at elevated temperatures greater than said maximum temperature, wherein at least part of the outer surface of the hollow body body member has sealant thereon.

2. A sealing device as claimed in claim 1, wherein the deformable portion of a flange is a peripheral region.

3. A sealing device as claimed in claim 2, wherein the peripheral region is capable, after deformation, of extending substantially parallel to the longitudinal axis of the body member.

4. A sealing device as claimed in claim 1, wherein each flange is so constructed that, during deformation, it bends about a circle section which extends substantially mid-way between the surface of the body member and the outer edge of the flange.

5. A sealing device as claimed in claim 1, wherein each flange tapers towards its edge remote from the body member.

6. A sealing device as claimed in claim 1, wherein the flanges are formed integrally with the body member.

7. A sealing device as claimed in claim 1, wherein there are at least four flanges.

8. A sealing device as claimed in claim 1, wherein the spacing between adjacent flanges is such that, after deformation, they do not contact each other.

9. A sealing device as claimed in claim 1, wherein the flanges extend in a generally perpendicular manner from the surface of the hollow body member.

10. A sealing device as claimed in claim 1, wherein the flanges slope away from the surface of the hollow body member.

11. A sealing device as claimed in claim 1, wherein each flange extends wholly around the outer surface of the hollow body member.

12. A sealing device as claimed in claim 1, wherein the widths of adjacent flanges are different.

13. A sealing device as claimed in claim 12, wherein the widths of adjacent flanges differ so as to impart a tapered outer configuration to the sealing device.

14. A sealing device as claimed in claim 1, wherein the widths of the flanges lie in the range of from 1 to 10 mm.

15. A sealing device as claimed in claim 14, wherein the widths of the flanges lie in the range of from 2 to 6 mm.

16. A sealing device as claimed in claim 1, wherein sealant is provided between adjacent flanges.

17. A sealing device as claimed in claim 16, wherein the amount of sealant provided is such that, on deformation, it fills the space between the adjacent flanges.

18. A sealing device as claimed in claim 1, wherein the sealant is a hot-melt adhesive.

19. A sealing device as claimed in claim 1, wherein the sealant is a mastic.

20. A sealing device as claimed in claim 1, wherein auxiliary sealing means are provided.

21. A sealing device as claimed in claim 20, wherein the auxiliary sealing means are formed integrally with the hollow body member.

22. A sealing device as claimed in claim 21, wherein the auxiliary sealing means comprises a heat-recoverable sleeve.

23. A sealing device as claimed in claim 20, wherein the auxiliary sealing means comprises a heat-recoverable sleeve.

24. A sealing device as claimed in claim 1, wherein an open end of the hollow member is provided with a rupturable or removable closure member.

25. A sealing device as claimed in claim 1, wherein the hollow body member is a tubular sleeve.

26. A sealing device as claimed in claim 1, wherein the hollow body member is a wrap-around member.

27. A sealing device as claimed in claim 1, which is an end cap.

28. A sealing device as claimed in claim 1, which is a grommet.

29. A sealing device as claimed in claim 1 in which only the flanges have a sealant thereon.

30. A sealing device as claimed in claim 1 in which the flanges have a sealant thereon.

31. A sealing device suitable for use as a duct seal comprising a hollow body member made of a polymeric material and provided on its outer surface with a plurality of spaced apart flanges, each flange extending away from and around said surface, such flanges having a peripheral region remote from the surface that is substantially rigid at the maximum temperature likely to be encountered in use of the device and deformable at temperatures greater than said maximum temperature, wherein at least part of the outer surface of the hollow body member has a heat-activatable sealant thereon.

32. A sealing device as claimed in claim 31 in which the hollow body member is made of a cross-linked thermoplastic polymer.

33. A sealing device as claimed in claim 31 in which the sealant is a hot-melt adhesive.

34. A sealing device as claimed in claim 31 in which the sealant is a semi-hot adhesive.

* * * * *